C. F. CARMAN.
Wagon Wheel.
No. 90,993.
Patented June 8, 1869.
Fig: 1.
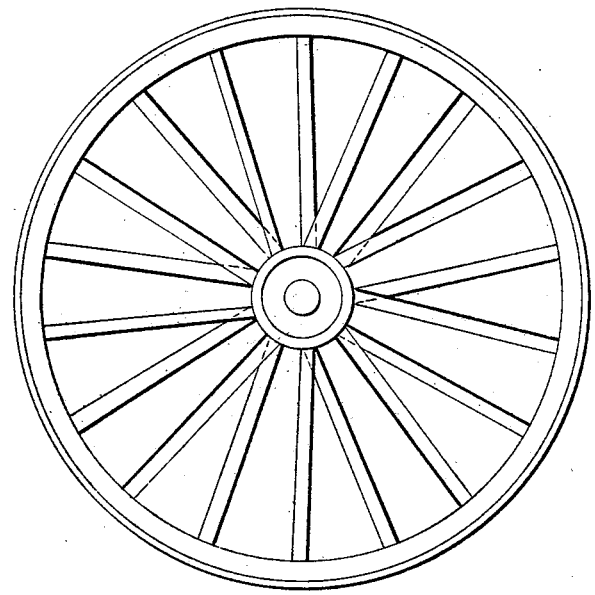
Fig: 2.
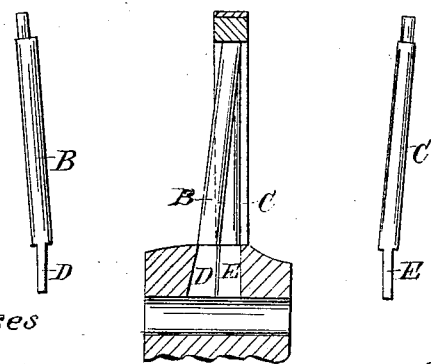
Witnesses
Inventor
Chas F Carman
PER
Attorneys

CHARLES F. CARMAN, OF HAMBURG, IOWA.

Letters Patent No. 90,993, dated June 8, 1869.

IMPROVEMENT IN CARRIAGE-WHEELS.

The Schedule referred to in these Letters Patent and making part of the same.

*To all whom it may concern:*

Be it known that I, CHARLES F. CARMAN, of Hamburg, in the county of Fremont, and State of Iowa, have invented a new and useful Improvement in Wagon-Wheels; and I do hereby declare that the following is a full, clear, and exact description thereof, which will enable others skilled in the art to make and use the same, reference being had to the accompanying drawing, forming part of this specification.

This invention relates to improvements in the construction of wagon-wheels, the object of which is to so arrange the spokes with the hub as to make stronger wheels than those constructed according to the present methods.

The invention consists in connecting two spokes to the hub in each mortise, one of which is dovetailed and keyed into the mortise, similarly formed, by driving the other as a key; and both spokes of each pair have inclined tenons, so that they branch in each direction to the rim at distances from each other equal to the distances from one to one of the next pair.

Figure 1 represents a side elevation of a wheel constructed according to my improvements.

Figure 2 represents a sectional view, showing the connection of one pair of spokes, also the spokes attached.

Similar letters of reference indicate corresponding parts.

I make wide mortises in the hub, as shown in fig. 2, and undercut one end of each, as at A, and arrange the spokes in pairs, B C, having inclined tenons, one to the right and the other to the left.

I also dovetail one tenon, D, and place it in the mortise first, driving the other afterwards, keying the first one in tightly.

The inclinations of the tenons to the right and left are calculated for wheels of various sizes, so that the space between the ends of each pair at the rim will be equal to the distance from a spoke of one pair to a spoke of a next pair.

Wheels constructed in this manner are more strongly braced by the divergence of the spokes from radial lines, and half the spokes being securely locked gives another material element of strength.

Having thus described my invention,

What I claim as new, and desire to secure by Letters Patent, is—

Connecting the spokes to the hubs in pairs in each mortise, when the tenons and the mortises are arranged substantially as specified.

CHARLES F. CARMAN.

Witnesses:
RUFUS B. CURTIS,
GEO. B. HALL.